July 5, 1960 G. F. NADEAU ET AL 2,943,937
SURFACE CONDITIONING AND SUBBING OF ORIENTED
LINEAR POLYESTER PHOTOGRAPHIC FILM SUPPORT
Filed June 12, 1956

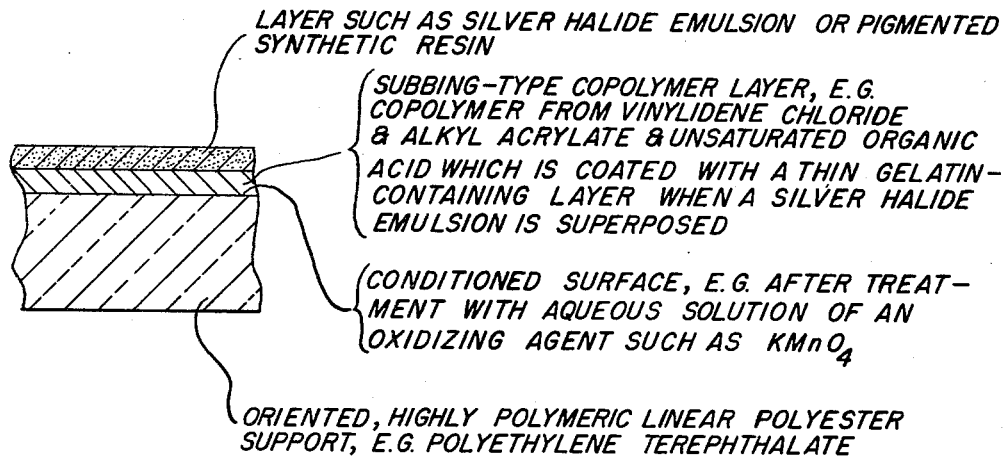

LAYER SUCH AS SILVER HALIDE EMULSION OR PIGMENTED
SYNTHETIC RESIN

SUBBING-TYPE COPOLYMER LAYER, E.G.
COPOLYMER FROM VINYLIDENE CHLORIDE
& ALKYL ACRYLATE & UNSATURATED ORGANIC
ACID WHICH IS COATED WITH A THIN GELATIN-
CONTAINING LAYER WHEN A SILVER HALIDE
EMULSION IS SUPERPOSED

CONDITIONED SURFACE, E.G. AFTER TREAT-
MENT WITH AQUEOUS SOLUTION OF AN
OXIDIZING AGENT SUCH AS $KMnO_4$

ORIENTED, HIGHLY POLYMERIC LINEAR POLYESTER
SUPPORT, E.G. POLYETHYLENE TEREPHTHALATE

GALE F. NADEAU
WALTER R. WHITE
INVENTORS

BY

ATTORNEYS 2,943,937

SURFACE CONDITIONING AND SUBBING OF ORIENTED LINEAR POLYESTER PHOTOGRAPHIC FILM SUPPORT

Gale F. Nadeau and Walter R. White, Rochester, N.Y., assignors to Eastman Kodak Company, Rochester, N.Y., a corporation of New Jersey Filed June 12, 1956, Ser. No. 590,984

11 Claims. (Cl. 96—87)

This invention relates to a process for the conditioning of photographic bases made from oriented linear polyesters so that subbing layers can be coated thereon and will adhere thereto.

The advent of synthetic resin photographic film bases, particularly polyester film bases, has presented many problems in the application of subbing and other layers to these film bases. Many of these problems were not encountered with cellulose ester film bases. The characteristics of highly polymeric polyesters are such that the normal hydrolysis and oxidation actions on cellulose bases, in order to produce a surface receptive to the adhesion of subbing and other layers, are not the same due to the different nature of the surface structure of the polyester films.

Various methods have been employed to get photographic silver halide emulsions to adhere to a polyester support.

One method is by the use of solvent materials which have several disadvantages. It is known in the art that substances such as orthocresol, trifluoroacetic acid, and many other compounds are solvents or softening agents for the polyesters and may be employed as a means for partially dissolving or softening the film surface in order to create an adherent surface. However, many of these materials are corrosive to both living tissue and materials which they may contact, or are otherwise objectionable, and once introduced onto the polyester cannot be readily cured therefrom.

Another method is to coat the polyester film with a lower molecular weight polyester which is adherent to gelatin emulsions and other photographic elements.

Still another method consists of treating an unoriented polyester film with certain copolymer latices comprising a substantial amount of vinylidene chloride with a moderate amount of acrylate and a smaller amount of ethylenically unsaturated acid, such as acrylic acid or itaconic acid. Such a coating will adhere to polyester films but must be applied before the final stretching and heat setting operations in order to perform satisfactorily. Such latices are inclined to be tacky at temperatures only somewhat above room temperature and thus restrict the temperature at which the stretching and heat setting operations can be conducted. This can be partially ameliorated by overcoating the latex with a thin gelatin layer. However, when the dried gelatin layer is stretched during the lengthwise or widthwise stretching operations, it tends to become opaque, probably due to a multitude of fine cracks.

As is evident, it is highly desirable to have a method whereby such latices can be applied after the final stretching and heat setting operations. Also, it is highly desirable to use some method which does not involve depositing undesirable chemicals on the film base.

We have found that by treating a linear highly polymeric oriented polyester film surface with certain inorganic oxidizing agents under conditions fully disclosed hereinbelow, after the final stretching and heat setting operations, the film surface is so conditioned that subbing layers of copolymer latices readily adhere thereto.

A principal object of our invention is to provide a method for the surface conditioning of oriented polyester films so that adjacent layers will adhere thereto.

A further object of our invention is to provide oriented photographic polyester film bases having a conditioned surface which will adhere to subbing, backing and other layers commonly applied to any photographic film base.

Another object of this invention is to provide a means whereby the surface conditioning can be performed and an opaque pigmented layer can be applied after the final stretching and heat setting operations.

Other objects will become apparent hereinafter.

The general method of carrying out our invention is to subject the oriented polyester film base to the action of an aqueous solution of certain inorganic acidic or basic compositions, which also have an oxidizing effect on the polyester film. This treatment is hereinafter called surface conditioning. After the surface conditioning of the film surface, copolymer solutions and latices (especially those of the vinyl chloride and vinylidene chloride type) can be applied by the usual methods. An opaque pigmented synthetic resin layer can be applied to such a coated surface directly or, an intermediate gelatin layer can be interposed and a photographic silver halide gelatin emulsion can then be applied.

It will be observed by those skilled in the art that the method of surface conditioning according to this invention is not analogous to the known methods for the conditioning of more common film bases because, in such methods, a specific chemical reaction ordinarily takes place on the film surface affecting the exposed radicals of the polymer chains. What occurs in the polyester type film bases is more than a specific surface-type chemical reaction since the surface conditioning apparently causes a partial breaking-up or degradation of the polymer chains on the surface of the film, thereby producing a surface to which the various copolymer latices used as subbing layers will adhere readily.

The highly polymeric oriented linear polyester film bases with which this invention is concerned include the cold-drawing, orientable polyesters described in Carothers U.S. Patents 2,216,736 and 2,071,250. More particularly, the polyester film bases treated herein include highly polymerized esters derived from bifunctional aromatic carboxylic acids such as terephthalic acid, 4,4'-sulfonyldibenzoic acid, etc. as well as hydrogenated aromatic carboxylic acids such as trans-1,4-cyclohexanedicarboxylic acid, etc., condensed with glycols of the series HO—$C_nH_{2n}$—OH (where $n$ is 2 to 10) such as ethylene glycol, 1,5-pentanediol, 2,2-dimethyl-1,3-propanediol, and other dihydroxy compounds such as cis or trans 1,4-cyclohexanedimethanol. Methods of preparing such polyesters are described in Whinfield et al. U.S. Patent 2,465,319, in Caldwell U.S. Patent 2,720,506, and in copending Bell et al. application Serial No. 554,639, filed December 22, 1955.

Numerous patents describe the preparation of photographic film base from such linear polyesters, all of which include the operations of extrusion followed by orientation accomplished by lengthwise and widthwise stretching and generally followed by heat setting. A great variety of methods are disclosed in the prior art as to how such photographic film base is processed so that it can satisfactorily support a light-sensitive silver halide emulsion of gelatin or the like. One advantageous process for accomplishing this is described in Alles et al. U.S. Patent 2,627,088 which describes extruding a polyester film, coating it with subbing-type copolymer employing an aqueous dispersion of a hydrophobic copolymer containing at least 35% by weight of vinylidene chloride, drying the coated film, and orienting the film by stretching.

Aqueous dispersions as well as solutions in organic solvents of copolymers which can be used in accordance with this invention can readily be prepared. Most advantageously the copolymers can be made by known processes from a mixture containing the designated monomers within the following ranges by weight:

| Monomer | Useful Range | Preferred Range |
| --- | --- | --- |
| | Percent | Percent |
| (1) Vinylidene chloride or vinyl chloride | 35 to 96 | 60 to 95 |
| (2) Itaconic acid, α-methacrylic acid, acrylic acid; citraconic acid, mesaconic acid, maleic acid, fumaric acid or other polymerizable ethylenically unsaturated carboxylic acidic compound including the anhydrides and half-esters of those which are dibasic | 0.5 to 25 | 1 to 10 |
| (3) Acrylic ester, α-methacrylic ester, acrylonitrile, or other polymerizable vinyl or vinylidene monomer different from (1) or (2) | 0 to 65 | 4 to 20 |

These copolymers are hereinafter referred to as subbing-type copolymers.

The preparation and application of latices of such copolymers is partially described in more restricted detail in U.S. 2,627,088 which can be referred to so as to more particularly understand certain valuable embodiments of this invention. As already indicated, organic solutions can be employed in lieu of the latices.

As already discussed above, the prior art procedures required that these subbing-type copolymers be coated on the polyester film base prior to orientation by stretching. Thus, this restricts the flexibility of the overall process and is accompanied by other influences on the ultimate utilization of the polyester film. For example, if the film is not ultimately used as a photographic support due to slight defects or other otherwise inconsequential imperfections, the presence of the subbing-type copolymer coating may represent an unnecessary expense in the film's preparation and may even be deleterious to some other uses. In view of these considerations, including the others mentioned above, there is great advantage under many circumstances in not coating the polyester film with the subbing-type copolymer until after the extrusion, biaxial planar orientation and heat setting have been completed.

According to this invention, the subbing-type copolymer coating can be applied to a linear highly polymeric oriented polyester film by first surface conditioning the film, then coating with the subbing-type copolymer and drying. The coated oriented polyester film having the subbing-type copolymer coating can then be additionally coated with various compositions by means well understood by those skilled in the photographic film making art.

The sole figure of the drawing illustrates certain preferred embodiments of the invention.

In order to determine which were satisfactory surface conditioning treatments and coating compositions, a simple tape test has been found quite useful. The oriented polyester film is subjected to the surface conditioning treatment, coated with the subbing-type copolymer coating composition which is cured at 175° F. or less for up to about 5 minutes (depending upon the characteristics thereof) after which the coated surface is scored with a knife, a strip of pressure-sensitive adhesive tape (such as Scotch brand tape) is rubbed onto the coated surface, and then quickly removed with a sudden jerk. If essentially all of the coating remains on the film, both it and the surface conditioning treatment are satisfactory. By using various predetermined satisfactory subbing-type copolymer coating compositions in conjunction with the testing of the surface conditioning procedures, those procedures which are satisfactory can be ascertained. This same tape test can also be used after additional layers have been superposed.

Surface conditioning treatments which the tape test shows can be used include aqueous solutions employed as follows:

SURFACE CONDITIONING TREATMENTS

| Aqueous solution (percent by weight) | Time of Treatment | Temp. of Treatment, ° F. |
| --- | --- | --- |
| A. 2.5% KMnO$_4$+1% NaOH | 3 min | 150 |
| B. Concentrated perchloric acid | 10 sec | 75 |
| C. 80% concentrated nitric acid | 5 sec | 100 |

Only certain surface conditioning treatments as illustrated above can be employed since many which appear closely analogous are unsatisfactory when subjected to the tape test described above. Thus, treatment for 30 minutes at 85° F. when using 25% sulfuric acid is unsatisfactory. Treatment is unsatisfactory at 85° F. for 30 minutes using concentrated hydrochloric acid. Moreover, many bases (such as 5% ammonia at 150° F. for 1 hour) do not produce satisfactory results. Likewise, many other acid treatments are inoperative such as: 50% p-toluenesulfonic acid, concentrated phosphoric acid, or glacial acetic acid, each being tried at 85° F. for 30 minutes. In certain instances treatment with aqueous bases and acids which do not include an oxidizing action may produce some surface conditioning action under conditions not considered to be practical, e.g. aqueous solutions such as 1% sodium hydroxide or 50% sulfuric acid or concentrated hydrochloric acid are all impractical although surface conditioning can be accomplished after a long period of time at a high temperature such as 30 minutes at 150° F.

Although the satisfactory procedures of this invention are not greatly restricted as to temperature, room temperature is generally as low a temperature as would be employed in surface conditioning operations. Such temperatures might be as low as 50° F. or lower in winter weather. Of the surface conditioning treatments encompassed by this invention, those are preferred which require only a few minutes at a temperature not high enough to affect the properties of the oriented polyester film. Since treatments such as B and C require special expensive equipment, treatment A illustrates an especially preferred embodiment of this invention.

The especially preferred surface conditioning treatment of this invention comprises treating the polyester film with a solution of an inorganic salt which is an oxidizing agent dissolved in water. Such solutions can contain from about 1% up to about 10%, or more, by weight of the oxidizing agent. Examples of such oxidizing agents include KMnO$_4$, NaClO$_3$, K$_2$Cr$_2$O$_7$, etc. These are merely illustrative and many others can be similarly employed. Their dilute solutions in water are frequently basic but it is generally advantageous to introduce a small additional quantity (up to about 5% by weight, or more) of an alkaline compound such as NaOH, KOH, LiOH, Na$_2$CO$_3$, KHCO$_3$, etc., so as to enhance the surface conditioning action, especially when the oxidizing agent is employed in relatively small quantities. The concentrations preferred are such that good results can be obtained by treating films for from 1 second to 10 minutes at less than about 175° F.

A very effective surface conditioning treatment also contemplated by this invention encompasses the use of an inorganic oxidizing acid such as HNO$_3$, HClO$_4$, HBrO$_4$, HClO$_3$, etc., which has been diluted with sufficient water so that the surface conditioning treatment can be effected in from a few seconds to several minutes at temperatures below about 175° F. Generally from about 15% to about 95% of such an acid is dissolved in the water, although more or less can also be employed. Treatments D and E are illustrative. More dilute solutions are equally advantageous and can be employed at the higher temperature range to achieve good results in from 1 second to 10 minutes.

There are also other operative procedures for surface conditioning which can be construed to be secondary equivalents to these preferred embodiments.

After the surface conditioning has been accomplished, the solutions in organic solvents or the latex coating to be applied is prepared from a subbing-type copolymer as described above. Subbing-type copolymers which can be employed are illustrated below where all quantities are by weight. As with the surface conditioning treatments, there are many unsatisfactory coating solutions and latices which do not adhere satisfactorily to oriented polyester film which has been surface conditioned according to this invention. Examples of unsatisfactory coating compositions together with some of those that can be employed according to this invention are presented in the following list wherein the determination as to satisfactory or unsatisfactory character was determined by the tape test described above. Component (a) of each coating composition represents the coating which remains on the film surface after the vehicle or solvent component (b) has been evaporated from the coated surface.

I. Unsatisfactory coating solution:
  (a) 1% cellulose triacetate
  (b) 99% of solvent—
    (1) 10% methyl alcohol
    (2) 85% methylene chloride
    (3) 5% methyl Cellosolve acetate II. Unsatisfactory coating solution:
  (a) 1.5% of mixture of—
    (1) 33% cellulose nitrate
    (2) 67% deashed gelatin
  (b) 98.5% of solvent—
    (1) 3% water
    (2) 5% glacial acetic acid
    (3) 5% methyl Cellosolve acetate
    (4) 55% acetone
    (5) 32% methyl alcohol III. Unsatisfactory coating solution:
  (a) 1.1% mixture of—
    (1) 95% gelatin
    (2) 5% formaldehyde
  (b) 98.9% of a mixture of—
    (1) 99.95% water
    (2) 0.05% saponin IV. Unsatisfactory coating solution:
  (a) 11% of resin from—
    (1) 25 mole percent urea
    (2) 25 mole percent melamine
    (3) 50 mole percent formaldehyde
  (b) 89% of methylene chloride solvent V. Satisfactory coating solution:
  (a) 2% of a copolymer of—
    (1) 78% vinyl chloride
    (2) 20% butyl acrylate
    (3) 2% citraconic acid
  (b) 98% solvent—
    (1) 40% cyclohexanone
    (2) 20% chloroform
    (3) 40% methylene dichloride VI. Satifactory coating solution:
  (a) 4% mixture of resins—
    (1) 50% epoxy resin of low degree of polymerization
    (2) 50% polyamide from dimerized vegetable oil acids plus a diamine
  (b) 96% of methylene chloride solvent VII. Satisfactory coating solution:
  (a) 2.5% of a copolymer of—
    (1) 90% vinylidene chloride
    (2) 8% acrylonitrile
    (3) 2% α-methacrylic acid
  (b) 97.5% solvent—
    (1) 70% dioxane
    (2) 30% methylene dichloride VIII. Satisfactory coating solution:
  (a) 1% of a copolymer of—
    (1) 86% vinyl chloride
    (2) 13% vinyl acetate
    (3) 1% maleic anhydride
  (b) 99% ethylene dichloride solvent This invention can be further illustrated by the following examples of useful embodiments, although it will be understood that these examples are included merely for purposes of illustration and are not intended to limit the scope of the invention unless otherwise specifically indicated:

*Example 1*

Highly polymeric polyethylene terephthalate, which had been stretched both length and widthwise then heat set, was immersed in a solution of 2.5 percent potassium permanganate, 1 percent sodium hydroxide and the balance water for 3 minutes at 150° F. After rinsing with water, the film was dipped into an aqueous latex consisting of 10% of a copolymer consisting of 66% vinylidene chloride, 30% butyl acrylate and 4% acrylic acid and 90% of a vehicle for the copolymer consisting of 1.35% of an alkyl aryl sulfonate dispersing agent, 0.65% saponin and the balance was water. After drying the coated sub-layer, the film support was capable of being coated directly with any type of synthetic resin; however, when a photographic silver halide emulsion is to be superposed, it is preferred to first apply a thin coat of gelatin so as to secure excellent adherence to the subbing-type vinylidene chloride copolymer. To accomplish this, the following solution was coated onto the support: 1% gelatin, 0.5% saponin, and 0.1% chrome alum and the balance water. This second coating was then dried. When the tape test described above was performed, the coated layers firmly adhered to the support. A photosensitive silver halide gelatin emulsion was then coated onto this coated film; adhesion of the emulsion before drying and after processing was excellent.

A similar experiment was made omitting the potassium permanganate and sodium hydroxide treatment. In this case, when the pressure-sensitive tape was pressed onto the surface and quickly removed, all of the latex sub-layer and gelatin sub-layer easily came off with the tape. When a photographic gelatin emulsion was coated onto this unsatisfactorily subbed film, it would not adhere well enough to be rolled onto a roll and this product was, therefore, worthless.

*Example 2*

Example 1 was repeated exactly except that coating solution VI described above was employed instead of the latex of the copolymer of Example 1. The results were essentially the same.

*Example 3*

Example 1 was repeated exactly except that the aqueous latex coating composition was replaced with coating solution VIII described above, which was roller coated onto the film at 120° F. The coated film was essentially identical to that of Examples 1 and 2. Photographically sensitive emulsions coated thereon adhered satisfactorily.

*Example 4*

Example 1 was repeated using an aqueous latex composition as follows:

(a) 20% of a copolymer of—
    (1) 88% vinylidene chloride
    (2) 10% methyl acrylate
    (3) 2% itaconic acid (b) 80% of a vehicle made up of—
(1) 1.5% of an alkyl aryl sulfonate dispersing agent
(2) 98.5% water The coated film was further coated with a photographic emulsion which had excellent adherence; an intermediate gelatin layer was used as in Example 1.

Example 5

Example 1 was repeated using an aqueous latex composition as follows:

(a) 15% of a copolymer of—
(1) 88% vinylidene chloride
(2) 8% acrylonitrile
(3) 4% itaconic acid mono-ethyl ester
(b) 85% of a vehicle made up of—
(1) 2% of sodium β-naphthalene sulfonate condensed with formaldehyde
(2) 98% water The cured and dry coating could not be stripped from the film using the tape test described above. The coated film was further coated with a gelatin layer as in Example 1 and then with a silver halide gelatin emulsion adapted for color photography. The emulsion adhered firmly to the coated film.

Examples 6–10

Examples 1–5 were repeated using an oriented and heat set film formed from a highly polymeric linear polyester derived from 4,4'-sulfonyldibenzoic acid and 1,5-pentanediol. The results were essentially the same.

Examples 11–15

Examples 1–5 were repeated using an oriented and heat set film formed from a highly polymeric linear polyester derived from terephthalic acid and a mixture of the cis and trans isomers of 1,4-cyclohexanedimethanol. The results were essentially the same.

Example 16

A sheet of highly polymeric polyethylene terephthalate which had been oriented and heat set was treated with surface conditioning treatment C described above, was then rinsed with water and the latex composition described in Example 1 was coated onto the conditioned surface as described in Example 1. The coated layer could not be stripped from the film using the tape test described above. Superposed coatings of various pigmented synthetic resins adhered firmly thereto.

Example 17

Example 16 was repeated except that the latex composition was replaced with coating solution VII described above which was roller coated onto the conditioned surface at 120° F. This coated layer could not be stripped from the film using the above described tape test. Photographic emulsions adhered firmly thereto.

Example 18

Biaxially oriented and crystallized polyethylene terephthalate was surface conditioned and coated with the subbing-type copolymer resulting from employing coating solution VIII according to the procedure described above. This subbing-type copolymer layer could not be stripped from the film using the tape test described above. A specimen of this film was then additionally coated with a pigmented synthetic resin coating composition. This coating composition was prepared by first grinding together:

(1) 30 parts of finely divided carbon
(2) 53 parts of a copolymer made up of—
(a) 50% by weight of methacrylic acid
(b) 50% by weight of methyl methacrylate
(3) 17 parts of methyl Carbitol This pigmented copolymer was made into a coating composition by dissolving 0.5 gram thereof in 95.5 grams of methanol. This coating composition was then coated upon the subbing-type copolymer coating and dried as described above. This superposed coating could not be stripped from the film using the tape test. It had excellent antihalation properties for use in connection with photographic film and was capable of being removed by normal alkaline photographic developing agents. This coating had a surface resistivity of less than 0.01 ohm. It remained firmly anchored to the film when wrapped in contact with an emulsion surface under relatively rigorous storage conditions.

Samples prepared according to Example 18 omitting the surface conditioning were found unsatisfactory for various reasons including the undesirable transferal of the carbon pigmented superposed coating to an adjacent emulsion coated surface as a result of normal wrapping and packaging procedure followed by ordinary storage conditions such as would be found in warehouses and retail outlets.

Example 19

Example 18 was repeated in exactly the same manner except that the superposed pigmented synthetic resin coating was prepared using Coblack Industrial composition made up of approximately:

(1) 35 parts of dispersed carbon
(2) 25 parts of dibutyl terephthalate
(3) 40 parts of cellulose nitrate (½ second)

This composition was made into a coating composition by dissolving 0.5 part in 99.5 parts of methanol.

This film containing the pigmented superposed coating was used as a leader for photographic film containing photographic silver halide emulsions and was subjected to photographic processing of the entire film under conditions where the surfaces were subjected to a high degree of scratching. Upon examination, it was found that the superposed pigmented coating was remarkably permanent and possessed an excellent degree of adherency. Similar superior qualities were shown by the tape test described above. When the surface conditioning treatment was omitted, the subbing-type copolymer and the superposed pigmented coating were unable to withstand the photographic processing; moreover, when the processed film was subjected to normal use, over half of the superposed pigment layer was scratched off before ¼ of the useful life of the leader had been reached.

Many additional examples show similar results to those described above. Numerous modifications are apparent. Thus, any of the satisfactory surface conditioning treatments described above can be employed, and the satisfactory coating compositions which can be applied to the conditioned surface have been likewise described hereinabove both in detail and as to their general composition and characteristics.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In a process for preparing a film adapted for photographic utility wherein the film support is an oriented and heat set highly polymeric linear polyester of a bifunctional aromatic dicarboxylic acid condensed with a dihydroxy organic compound, the steps comprising (I) conditioning the surface of the oriented and heat set film for from about 1 second to about 5 minutes at from about 50° F. to about 175° F. by contact with an aqueous oxidizing solution selected from the group consisting of (1) a solution of from about 1% up to about 10% by weight of an inorganic salt which is an oxidizing agent dissolved in water containing up to about 5% by weight of an alkaline inorganic compound, and (2) a solution of from about 15% up to about 95% by weight of an inorganic oxidizing acid dissolved in water, and (II) coating the conditioned surface with an adherent copolymer of at least 35% by weight of a monomer selected from the group consisting of vinyl chloride and vinylidene chloride, and from about 0.5 to 25% of an ethylenically unsaturated monomeric copolymerizable carboxylic acidic compound, wherein said carboxylic acidic compound is selected from the group consisting of itaconic acid, citraconic acid, mesaconic acid, acrylic acid, α-methacrylic acid, maleic acid, fumaric acid and the anhydrides and lower alkyl half esters of those acids which are dibasic.

2. In a process as defined by claim 1 wherein the adherent copolymer coating is further coated with a thin gelatin-containing layer and an additional photographic silver halide gelatin emulsion layer.

3. In a process as defined in claim 1 wherein the adherent copolymer is further coated with a synthetic resin containing a carbon black pigment.

4. In a process as defined in claim 1 wherein the adherent copolymer is made from 60 to 96% by weight of vinylidene chloride, 4 to 20% by weight of an acrylic ester of a lower alkanol and 1 to 10% by weight of acrylic acid.

5. In a process for preparing a film adapted for photographic utility wherein the film support is an oriented and heat set highly polymeric linear polyethylene terephthalate, the steps comprising (I) conditioning the surface of the oriented and heat set film for from about 1 second to about 10 minutes at from about 50° F. to about 175° F. by contact with an aqueous oxidizing solution containing from about 1% up to about 10% by weight of a permanganate salt dissolved in water containing up to about 5% of an alkali metal hydroxide, and (II) coating the conditioned surface with an adherent copolymer containing from 60 to 96% by weight of vinylidene chloride, from 4 to 20% by weight of an acrylic ester of a lower alkanol and from 1 to 10% of acrylic acid.

6. In a process as defined by claim 5, the additional step wherein the adherent copolymer coating is further coated with a thin gelatin-containing layer and an additional photographic silver halide gelatin emulsion layer.

7. In a process as defined by claim 5, the additional step wherein the adherent copolymer is further coated with a synthetic resin containing a carbon black pigment.

8. In a process as defined in claim 7 wherein the synthetic resin containing a carbon black pigment is a plasticized copolymer of methyl methacrylate and methacrylic acid containing a dispersion of finely-divided carbon black pigment.

9. A photographic element comprising (I) a film support consisting of an oriented and heat set highly polymeric linear polyester of a bifunctional aromatic dicarboxylic acid condensed with a dihydroxy organic compound, (II) a chemically conditioned surface on said film support formed by contact for from about 1 second to about 5 minutes at from about 50° F. to about 175° F. with an aqueous oxidizing solution selected from the group consisting of (1) a solution of from about 1% up to about 10% by weight of an inorganic salt which is an oxidizing agent dissolved in water containing up to about 5% by weight of an alkaline inorganic compound, and (2) a solution of from about 15% up to about 95% by weight of an inorganic oxidizing acid dissolved in water, and (III) an adherent copolymer on said conditioned surface made from at least 35% by weight of a monomer selected from the group consisting of vinyl chloride and vinylidene chloride and from about 0.5 to 25% of an ethylenically unsaturated monomeric copolymerizable carboxylic acid compound, wherein said carboxylic acidic compound is selected from the group consisting of itaconic acid, citraconic acid, mesaconic acid, acrylic acid, α-methacrylic acid, maleic acid, fumaric acid and the anhydrides and lower alkyl half esters of those acids which are dibasic.

10. A photographic element as defined by claim 9 having a thin gelatin-containing layer upon said adherent copolymer.

11. A photographic element as defined by claim 9 having a synthetic resin containing a carbon black pigment upon said adherent copolymer.

References Cited in the file of this patent

UNITED STATES PATENTS

| | | |
|---|---|---|
| 1,929,254 | Narath | Oct. 3, 1933 |
| 2,653,892 | Gentle et al. | Sept. 29, 1953 |
| 2,668,134 | Horton | Feb. 2, 1954 |
| 2,698,235 | Swindells | Dec. 28, 1954 |
| 2,698,240 | Alles et al. | Dec. 28, 1954 |
| 2,767,103 | Loukomski | Oct. 16, 1956 |
| 2,805,173 | Ambler | Sept. 3, 1957 |

FOREIGN PATENTS

| | | |
|---|---|---|
| 722,875 | Great Britain | Feb. 2, 1955 |

OTHER REFERENCES

Szwarc: The Action of Carbon Black in Stabilizing Polymeric Materials, J. Polymer Science, March 1956, pp. 589–590.